(12) United States Patent
Stanhope et al.

(10) Patent No.: US 10,231,376 B1
(45) Date of Patent: Mar. 19, 2019

(54) SYSTEMS AND METHOD FOR DETERMINING TRENCH CLOSURE BY A PLANTER OR SEEDER

(71) Applicant: CNH Industrial America LLC, New Holland, PA (US)

(72) Inventors: Trevor Philip Stanhope, Darien, IL (US); Kevin Michael Smith, Narvon, PA (US); Douglas James Rylander, LaSalle, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/692,482

(22) Filed: Aug. 31, 2017

(51) Int. Cl.
| | |
|---|---|
| *A01C 5/06* | (2006.01) |
| *A01C 7/20* | (2006.01) |
| *A01B 63/00* | (2006.01) |
| *A01B 49/04* | (2006.01) |
| *A01B 79/00* | (2006.01) |

(52) U.S. Cl.
CPC ............... *A01C 5/06* (2013.01); *A01B 49/04* (2013.01); *A01B 63/008* (2013.01); *A01C 7/203* (2013.01); *A01B 79/005* (2013.01); *A01C 7/205* (2013.01)

(58) Field of Classification Search
USPC .................................................. 382/100, 103
See application file for complete search history.

(56) References Cited

U.S. PATENT DOCUMENTS

| | | | |
|---|---|---|---|
| 5,323,721 A | 6/1994 | Tofte et al. | |
| 5,675,489 A | 10/1997 | Pomerleau | |
| 5,974,348 A | 10/1999 | Rocks | |
| 6,285,930 B1 | 9/2001 | Dickson et al. | |
| 6,445,983 B1 | 9/2002 | Dickson et al. | |
| 6,768,944 B2 | 7/2004 | Breed et al. | |

(Continued)

FOREIGN PATENT DOCUMENTS

WO  20160182906 A1  11/2016

OTHER PUBLICATIONS

O'Connor et al; "Kinematic GPS for Closed-Loop Control of Farm and Construction Vehicles;" ION GPS-95, Sep. 1995.

*Primary Examiner* — Ishrat I Sherali
(74) *Attorney, Agent, or Firm* — Rebecca L. Henkel; Rickard K. DeMille (57) ABSTRACT

An agricultural planting or seeding implement includes a frame, at least one row unit, one or more imaging devices, and a processor. The at least one row unit includes a seed trench opening assembly extending along an opening line and configured to open a seed trench, a seed deposition assembly configured to deposit a seed in the open seed trench, and a seed trench closing assembly extending along a closing line and configured to close the seed trench. The one or more imaging devices capture images of a field behind the agricultural planting implement as the agricultural planting implement traverses the field. The processor processes the images captured by the one or more imaging devices, including determining a location of the opening line based on the captured images, determining a location of the closing line based on the captured images, determining whether the opening line and the closing line are aligned with one another, and determining a corrective action to bring the opening line and the closing line into alignment in response to determining that the opening line and the closing line are not aligned with one another.

20 Claims, 9 Drawing Sheets

(56) References Cited

U.S. PATENT DOCUMENTS

| | | |
|---|---|---|
| 6,819,780 B2 | 11/2004 | Benson et al. |
| 7,218,775 B2 | 5/2007 | Kokko et al. |
| 7,242,791 B2 | 7/2007 | Han et al. |
| 7,630,806 B2 | 12/2009 | Breed |
| 7,703,404 B2 | 4/2010 | Horn et al. |
| 8,189,901 B2 | 5/2012 | Modiano et al. |
| 8,326,500 B2 * | 12/2012 | Mariman ............... A01C 5/066 111/200 |
| 8,548,649 B2 | 10/2013 | Guyette et al. |
| 8,577,537 B2 | 11/2013 | Matthews |
| 8,633,810 B2 | 1/2014 | Luo et al. |
| 8,625,310 B2 | 9/2014 | Kowalchuk |
| 8,977,489 B2 | 3/2015 | Szczerba et al. |
| 9,179,593 B2 * | 11/2015 | Anderson ............... A01C 5/064 |
| 9,265,192 B2 | 2/2016 | Chan et al. |
| 9,408,342 B2 | 8/2016 | Lindores |
| 9,795,077 B2 * | 10/2017 | Hahn ............... A01C 5/066 |
| 2008/0304710 A1 | 12/2008 | Xu et al. |
| 2014/0379228 A1 | 12/2014 | Batcheller et al. |
| 2015/0373904 A1 | 12/2015 | Hahn et al. |
| 2016/0010998 A1 | 1/2016 | Chia et al. |
| 2016/0192580 A1 * | 7/2016 | Wendte ............... A01C 19/02 111/177 |
| 2017/0000020 A1 | 1/2017 | Maniar et al. |
| 2017/0049044 A1 * | 2/2017 | Stoller ............... A01C 23/025 |
| 2018/0114305 A1 * | 4/2018 | Strnad ............... A01B 79/005 |
| 2018/0128933 A1 * | 5/2018 | Koch ............... A01B 79/005 |
| 2018/0184581 A1 * | 7/2018 | Morgan ............... G01N 21/4738 |
| 2018/0224537 A1 * | 8/2018 | Taylor ............... G01S 13/58 |
| 2018/0238823 A1 * | 8/2018 | Puhalla ............... A01B 79/005 |
| 2018/0263174 A1 * | 9/2018 | Hodel ............... A01C 5/068 |

* cited by examiner

SYSTEMS AND METHOD FOR DETERMINING TRENCH CLOSURE BY A PLANTER OR SEEDER

BACKGROUND

This disclosure relates generally to agricultural planters and seeders, and more specifically to determining trench closure by a planter.

In agricultural applications, seeds typically are planted in rows along planting lines in a field. To plant seeds, a planter or seeder is directed across the field (e.g., towed behind a work vehicle, such as a tractor). As the planter or seeder traverses the field, row units of the planter or seeder open seed trenches, deposit seeds in the seed trenches, and close the seed trenches. If a row unit is not properly aligned (e.g., due to frame flex, side-hill slope, steering discrepancies, hitch position, etc.), or if a row unit is not properly configured (e.g. due to excessive down pressure, closing system pressure, closing system configuration, etc.), due to a component functional failure (e.g. jammed opening disks, damaged firming point, etc.), or the operating speed exceeds acceptable limits for the current field conditions, then the row unit may not completely close the seed trench, which could reduce the productivity and/or efficiency of the planting operation, and/or reduce crop yield. For example, the seeds may not grow as well in a seed trench that is left open or only partially closed, as compared to a seed planted in a closed trench.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In one embodiment, an agricultural planting or seeding implement includes a frame, at least one row unit, one or more imaging devices, and a processor. The at least one row unit includes a seed trench opening assembly extending along an opening line and configured to open a seed trench, a seed deposition assembly configured to deposit a seed in the open seed trench, and a seed trench closing assembly extending along a closing line and configured to close the seed trench. The one or more imaging devices capture images of a field behind the agricultural planting implement as the agricultural planting implement traverses the field. The processor analyzes the imaging data captured by the one or more imaging devices, including determining a location of the opening line based on the captured images, determining a location of the closing line based on the captured images, determining whether the opening line and the closing line are aligned with one another, and determining a corrective action to bring the opening line and the closing line into alignment in response to determining that the opening line and the closing line are not aligned with one another.

In another embodiment, an imaging system includes one or more imaging devices and a processor. The one or more imaging devices are configured to be coupled to a frame of an agricultural planting or seeding implement, and to capture imaging data of a field behind the agricultural planting or seeding implement as the implement traverses the field. The processor analyzes the images captured by the one or more imaging devices, including determining a location of an opening line based on the captured images, wherein the opening line is aligned with a seed trench opening assembly configured to open a seed trench, determining a location of a closing line based on the captured images, wherein the closing line is aligned with a seed trench closing assembly configured to close the seed trench, determining whether the opening line and the closing line are aligned with one another, and determining a corrective action to bring the opening line and the closing line into alignment in response to determining that the opening line and the closing line are not aligned with one another.

In a further embodiment, a method includes directing an agricultural planting or seeding implement across a field, capturing one or more images of the field behind the agricultural planting or seeding implement as the agricultural planting or seeding implement traverses the field, via one or more imaging devices coupled to the agricultural planting or seeding implement, determining a location of an opening line based on the captured images, determining a location of a closing line based on the captured images, determining whether the opening line and the closing line are aligned with one another, and determining a corrective action to bring the opening line and the closing line into alignment in response to determining that the opening line and the closing line are not aligned with one another. The agricultural planting or seeding implement has at least one row unit, which includes a seed trench opening assembly extending along the opening line and configured to open a seed trench, a seed deposition assembly configured to deposit a seed in the open seed trench, and a seed trench closing assembly extending along the closing line and configured to close the seed trench.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
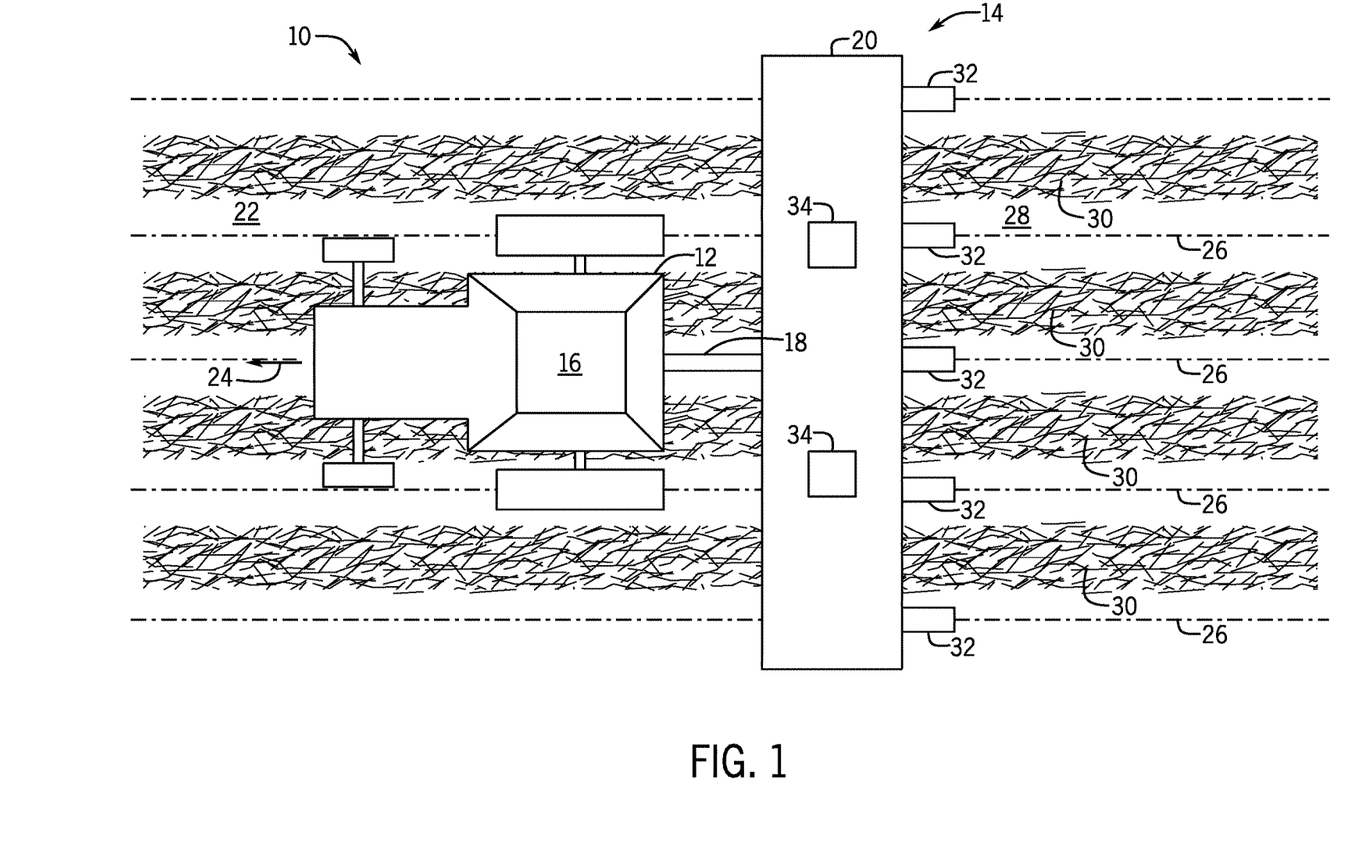
FIG. 1 is a top view of an embodiment of an agricultural system.

FIG. 1 is a top view of an embodiment of an agricultural system 10. The agricultural system 10 includes a work vehicle 12 (e.g., a tractor) and an agricultural implement 14 (e.g., a planter). In some embodiments, the agricultural implement 14 may be towed behind the work vehicle 12 (e.g., as shown in FIG. 1). In other embodiments, the agricultural implement 14 may be incorporated into the work vehicle 12. The work vehicle 12 may be any vehicle suitable for towing the agricultural implement 14, such as a tractor, off-road vehicle, or the like. The work vehicle 12 may include a cab 16, in which an operator sits during operation of the work vehicle 12. The agricultural implement 14 may be coupled to the work vehicle 12 via a hitch 18. In one embodiment, the hitch 18 may be a three-point hitch that rigidly couples the implement 14 to the work vehicle 12, such that the agricultural implement 14 can move upward and downward, but cannot freely rotate with respect to the work vehicle 12. In another embodiment, the agricultural implement 14 may be coupled to the work vehicle 12 via a drawbar, enabling the agricultural implement to move 14 upward, downward, and rotate with respect to the work vehicle 12. In another embodiment, the implement 14 may be coupled to the work vehicle 12 via a steerable hitch, enabling the implement to move upward, downward, and be actuated to rotate or slide laterally with respect to the work vehicle 12. It should be understood, however that other systems for coupling the agricultural implement 14 to the work vehicle 12 may be used. In the illustrated embodiment, the agricultural implement 14 is attached to the work vehicle 12 via a tool bar 20 and the hitch 18. The agricultural system 10 travels over a field 22. The work vehicle 12 is configured to tow the agricultural implement 14 in a direction of travel 24. For reference, a forward direction should be understood to be in the direction of travel 24 and a rearward direction should be understood to be opposite the direction of travel 24. As the agricultural system 10 traverses the field 22, each row unit 32 opens a seed trench, plants seeds along a planting line 26, and then closes the seed trench.

As shown, the planting lines 26 extend across the field 22. Though the planting lines 26 extend substantially parallel to one another, embodiments in which the planting lines 26 are not parallel to one another may also be employed. In some embodiments, maps of the strips 28 and/or planting lines 26 may be utilized to guide the work vehicle 12 and the agricultural implement 14 across the field 22. In the illustrated embodiment, each planting line 26 extends along the center of a respective strip 28, however, in other embodiments, one or more planting lines may be biased toward one side of the respective strip(s) 28. As the agricultural implement 14 traverses the field 22, the row units 32 engage the soil to perform various tasks (e.g., open the seed trench, plant seeds, close the seed trench, pack soil onto the planted seeds, etc.). As shown, the row units 32 engage the soil along the planting lines 26, which may or may not extend through the center of the strips 26. One or more imaging devices 34 (e.g., cameras or LIDAR sensors) may be disposed on the agricultural implement 14 and/or the work vehicle 12 and configured to generate imaging data of the field 22, and in some cases, a portion of the agricultural implement 14. These images may be used to determine whether one or more of the seed trenches are being sufficiently closed by the respective row unit(s).

Figure 2:
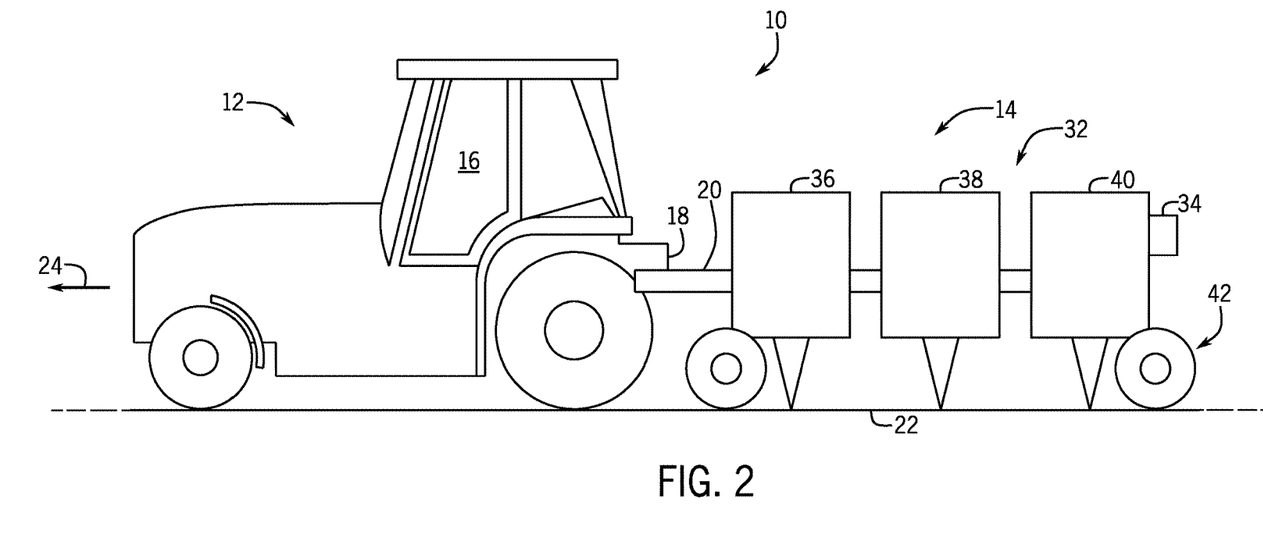
FIG. 2 is a side view of an embodiment of the agricultural system of FIG. 1.

FIG. 2 is a side view of the agricultural system of FIG. 1. As illustrated, each row unit of the agricultural implement 14, in this case a planter, includes an opening assembly 36, a seed deposition assembly 38, a closing assembly 40, and a packing assembly 42. However, other embodiments may omit one or more of these assemblies, include additional assemblies, or have different combinations of assemblies. As the work vehicle 12 tows the planter 14 across the field 22, the opening assembly 36 of each row unit 32 opens a seed trench, the seed deposition assembly 38 of each row unit 32 plants one or more seeds in the open seed trench, the closing assembly 40 of each row unit 32 closes the seed trench, and the packing assembly 42 packs soil on top of the seeds. In some embodiments, the closing assembly 40 may be omitted and the packing assembly 42 may be used to close and pack the seed trench. In other embodiments, the packing assembly 42 may be omitted. However, if an opening line (e.g., a line extending through the opening assembly) and a closing line (e.g., a line extending through the closing assembly) of the row unit 32 are not aligned with one another, then the opening assembly 36 and the closing assembly 40 may not each be aligned with the one another, resulting in unclosed seed trenches. For example, when facing from the agricultural row unit 32 downward toward the field 22, if the opening assembly 36 is positioned to the left of the planting line, the seed deposition assembly 38 is positioned directly above the seed planting line 26, and the closing assembly 40 is positioned to the right of the planting line 26, then the closing assembly 40 may not sufficiently close the seed trench because the opening assembly 36 opened the seed trench to the left of the planting line 26, and the closing assembly 40 is positioned to the right of the planting line 26, offset from the opening assembly 36. In such a configuration, the seeds planted in seed trenches that are not fully closed may not grow as well as seeds planted in fully closed seed trenches.

Accordingly, the one or more imaging devices 34 (e.g., cameras) may be disposed on the agricultural implement 14, facing rearward, and configured to generate images of the field 22, and in some cases, a portion of the agricultural implement 14, such that a determination may be made as to whether each seed trench has been closed. The imaging devices 34 may be digital cameras, analog cameras, red-green-blue (RGB) cameras, red-green-blue with depth sensor (RGB-D) cameras, infrared (IR) cameras, multispectral cameras, other imaging devices, or some combination thereof. The imaging devices 34 may be monocular or stereo vision. In some embodiments, the imaging devices 34 may also include laser scanners radar sensors, or other devices that may not generate a two-dimensional image. For example, if the one or more imaging devices 34 are laser scanners, the imaging devices 34 may generate a one-dimensional indication of a distance between the field 22 and the implement 14 (e.g., row unit 32), a two-dimensional scan-line (e.g. of the seed trench cross-section), or a three-dimensional point-cloud. For example, a one-dimensional embodiment may make an alignment determination based on single point feedback, a two-dimensional embodiment may make an alignment determination based on a single scan-line giving a distance, an azimuth and a reflection intensity, and a three-dimensional embodiment may make an alignment determination based on a multiple scan-line point-cloud giving distance, an azimuth, and a reflection intensity. The imaging devices 34 may be coupled to the agricultural implement (e.g., via an agricultural implement tool bar or on the one or more row units).

Figure 3:
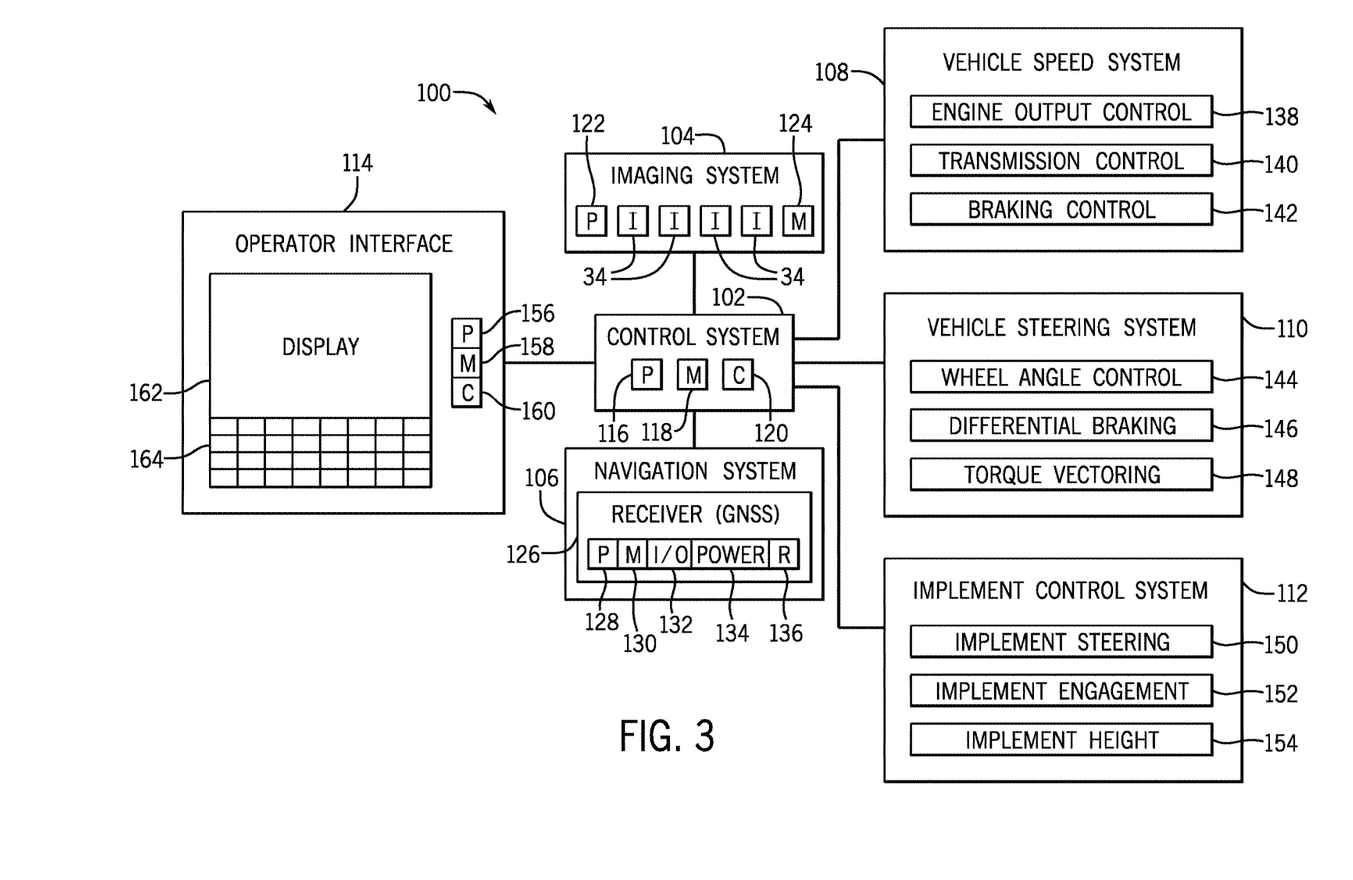
FIG. 3 is a schematic view of an embodiment of a control system that may be used within the agricultural system of FIG. 1.

FIG. 3 is a schematic view of one embodiment of a control system 100 that may be used within the agricultural system 10 shown in FIG. 1. In the illustrated embodiment, the control system 100 includes a vehicle control system 102, an imaging system 104, a navigation system 106, a vehicle speed system 108, a vehicle steering system 110, an agricultural implement control system 112, and an operator interface 114. However, it should be understood that other embodiments of the control system 100 may include different elements in alternative combinations.

The work vehicle control system 102 may include a processor 116, a memory component 118, and communication circuitry 120. The processor 116 may include one or more general-purpose processors, one or more application specific integrated circuits, one or more field programmable gate arrays, or the like. The memory 118 may be any tangible, non-transitory, computer readable medium that is capable of storing instructions executable by the processor 116 and/or data that may be processed by the processor 116. The memory 118 may include volatile memory, such as random access memory, or non-volatile memory, such as hard disk drives, read-only memory, optical disks, flash memory, and the like. The communication circuitry 120 may be configured to receive inputs (e.g., feedback signals, sensor signals, etc.) and transmit outputs (e.g., control signals, command signals, etc.) to/from the imaging system 104, the navigation system 106, the vehicle speed system 108, the vehicle steering system 110, the agricultural implement control system 112, and the operator interface 114.

As shown, the imaging system 104 may include a processor 122, a memory component 124, and one or more imaging devices 34. The processor 122 may include one or more general-purpose processors, one or more application specific integrated circuits, one or more field programmable gate arrays, or the like. The processor 122 may control the imaging devices 34 (e.g., control when images are taken). In some embodiments, the processor 122 may also be used to process and/or analyze data (e.g., captured images) output by the imaging devices 34. The memory 124 may be any tangible, non-transitory, computer readable medium that is capable of storing data created by the imaging devices 34 (e.g., image files), and/or storing instructions executable by the processor 122 and/or data that may be processed by the processor 122. The memory 124 may include volatile memory, such as random access memory, or non-volatile memory, such as hard disk drives, read-only memory, optical disks, flash memory, and the like.

The navigation system 106 may be in communication with the vehicle control system 102 (e.g., via the communication circuitry 120). The navigation system 106 may include a Global Navigation Satellite System (GNSS) receiver 126 configured to communicate with two or more satellites in orbit (e.g., GPS, GLONASS, Galileo, BeiDou, etc.) to determine the location, heading, speed, etc. of the work vehicle. The receiver 126 may include one or more processors 128, a memory component 130, input/output 132, a power supply 134, and radio circuitry 136. The processors 128 may execute software stored on the memory component 130 to determine the position of the work vehicle. In some embodiments, the work vehicle position, heading, speed, etc. may be compared relative to a map or a planned path stored in memory 130. Based on the determined position, the processor 128 may also determine work vehicle heading, speed, etc. Based on the work vehicle information received from the navigation system 106, the vehicle control system 102 may determine (e.g., via the processor 116) the relative proximity of the agricultural system to one or more strips, one or more boundaries, one or more headlands, etc.

The vehicle speed system 108 may control the speed of the work vehicle in the direction of travel. Control of the speed may be by control of a throttle, control of a clutch, control of brakes, control of a transmission, control of one or more other systems, or a combination thereof. In the illustrated embodiment, the speed control system 108 includes an engine output control system 138, a transmission control system 140, and a braking control system 142. The engine output control system 138 is configured to vary the output of an engine to control the speed of the work vehicle. For example, the engine output control system 138 may vary a throttle setting of the engine, a fuel/air mixture of the engine, a timing of the engine, and/or other suitable engine parameters to control engine output. In addition, the transmission control system 140 may adjust the gear ratio within a transmission to control the speed of the work vehicle. For example, the transmission control system 140 may enable manual or automatic changing of gears or a gear ratio via the transmission as a way to control the speed of the work vehicle. The transmission may include a number of fixed gear ratios or a continuously variable gear ratio. Furthermore, the braking control system 142 may adjust braking force, thereby controlling the speed of the work vehicle (e.g., slow the work vehicle down at the end of a row in order to make a turn). While the illustrated vehicle speed system 108 includes the engine output control system 138, the transmission control system 140, and the braking control system 142, alternative embodiments may include any of these systems, in any suitable combination. Further embodiments may include a vehicle speed system having other and/or additional systems to facilitate adjusting the speed of the work vehicle. The vehicle speed system 108 may be controlled by the operator in a manual mode of operation. In an automatic or semi-automatic mode of operation, the vehicle speed system 108 may be controlled automatically or semi-automatically by the vehicle control system 102.

The vehicle steering system 110 may control the steering of the work vehicle. In the illustrated embodiment, the vehicle steering system 110 includes a wheel angle control system 144, a differential braking system 146, and a torque vectoring system 148. The wheel angle control system 144 may automatically rotate one or more wheels or tracks of the work vehicle (e.g., via mechanical or hydraulic actuators) to steer the work vehicle along a path. By way of example, the wheel angle control system 144 may rotate front wheels/tracks, rear wheels/tracks, and/or intermediate wheels/tracks of the work vehicle, either individually or in groups. In some embodiments, steering may be accomplished by varying the speed of wheels or tracks on either side of the work vehicle. In some embodiments, the wheel angle control system 144 may be hydraulically actuated rather than, or in addition to, mechanically actuated (e.g., via gears). A hydraulically actuated steering system 110 may enable the work vehicle to turn without corresponding movement of a steering wheel (or other steering input device) inside the cab during an automatic or semi-automatic drive mode. The differential braking system 146 may independently vary the braking force on each side of the work vehicle to direct the work vehicle along the path. Similarly, the torque vectoring system 148 may differentially apply torque from the engine to wheels and/or tracks on each side of the work vehicle, thereby directing the work vehicle along the path. While the illustrated vehicle steering system 110 includes the wheel angle control system 144, the differential braking system 146, and the torque vectoring system 148, alternative embodiments may include any of these systems, in any suitable combination. Further embodiments may include a vehicle steering system having other and/or additional systems to facilitate directing the work vehicle along the path (e.g., an articulated steering system, etc.). The vehicle steering system 110 may be controlled by the operator in a manual mode of operation. In an automatic or semi-automatic mode of operation, the vehicle steering system 110 may be controlled automatically by the vehicle control system 102. For example, in a semi-automatic mode of operation, the steering system 110 may be automatically controlled by the vehicle control system 102, and the speed system 108 may be controlled by the operator. In a fully automatic mode of operation, both the speed system 108 and the steering system 110 may be controlled by the control system 102.

The agricultural implement control system 112 may be used to control the agricultural implement. For example, the agricultural implement control system 112 may turn the agricultural implement, raise or lower the agricultural implement, engage or disengage the agricultural implement, deploy ground-engaging tools of the agricultural implement, control the speed of the agricultural implement, etc., or a combination thereof. In the illustrated embodiment, the agricultural implement control system 112 includes an agricultural implement steering system 150, an agricultural implement engagement system 152, and an agricultural implement height system 154. The agricultural implement steering system may turn the agricultural implement (e.g., by actuating one or more wheels and/or tracks) based on signal received from the vehicle control system 102. For example, if the imaging system 104 or the vehicle control system 102 determines that the closing systems of the agricultural implement are not aligned with the seed trench, the control system 102 may generate a control signal to the agricultural implement steering system 150 to steer the agricultural implement to align the row units along the planting lines. In some embodiments, steering may be accomplished by varying the speed of wheels or tracks on either side of the work implement. In some embodiments, the agricultural implement steering system 150 may be hydraulically actuated rather than, or in addition to, mechanically actuated (e.g., via gears). The agricultural implement engagement system 152 controls whether the agricultural implement is in a lowered working position or a raised transport position. In some embodiments, for example, the agricultural implement may be disengaged and/or retracted such that the work vehicle can traverse a soft boundary (e.g., tall grass) or a portion of the field that is not being cultivated. The agricultural implement height system 154 may be used to control the height of the engaged agricultural implement relative to the ground (e.g., while the implement is in the lowered working position). While the illustrated agricultural implement control system 112 includes the agricultural implement steering system 150, the agricultural implement engagement system 152, and the agricultural implement height system 154, alternative embodiments may include any of these systems, in any suitable combination. Further embodiments may include an agricultural implement control system having other and/or additional systems to facilitate directing the implement along the path (e.g., an articulated steering system, etc.). The agricultural implement control system 112 may be controlled by the operator in a manual mode of operation. In an automatic or semi-automatic mode of operation, the agricultural implement control system 112 may be controlled automatically by the vehicle control system 102.

The operator interface 114 may be disposed inside the cab of the work vehicle and be configured to display information for, and receive inputs from, the operator. In the illustrated embodiment, the operator interface 114 includes a processor 156, a memory component 158, communication circuitry 160, a display 162, and operator inputs 164. The processor 156 may include one or more general-purpose processors, one or more application specific integrated circuits, one or more field programmable gate arrays, or the like. The memory 158 may be any tangible, non-transitory, computer readable medium that is capable of storing instructions executable by the processor 156 and/or data that may be processed by the processor 156. The memory 158 may include volatile memory, such as random access memory, or non-volatile memory, such as hard disk drives, read-only memory, optical disks, flash memory, and the like. The communication circuitry 160 may be configured to communicate with the vehicle control system 102 (e.g., via the communication circuitry 120 of the vehicle control system 102). In some embodiments, the communication circuitry 120, 160 may communicate with various components in the system wirelessly. In some embodiments, the operator interface 114 and the vehicle control system 102 may be disposed within the same housing, may share processors 116, 156, memory components 118, 158, and/or communication circuitry 120, 160. In further embodiments, the vehicle control system 102 and the operator interface 114 may be the same component. The operator interface 114 includes the display 162 configured to display information related to the agricultural system 10 to the operator. The display 162 may be a screen, an array of LEDs, a series of gauges, a combination thereof, or some other arrangement. The operator interface 114 also includes the operator inputs 164 that enables a user to input information. The operator inputs 164 may include a keyboard, a series of buttons, a joystick, a mouse, a track pad, etc. In some embodiments, the display 162 and the operator input 164 may be a single component (e.g., a touchscreen).

As the work vehicle tows the agricultural implement through the field, the imaging system 104 captures data via the imaging devices 34, which are mounted on the agricultural implement, facing rearward. Images may be captured periodically, at set intervals, in response to triggering events (e.g., user depresses a button), or substantially continuously. The imaging system 104 and/or control system may process and analyze the images to identify whether the closing assembly is effectively closing the seed trench. In some embodiments, if the seed trench is not being closed, the control system 102 may automatically take corrective action, steering the work vehicle and/or the agricultural implement, and/or adjusting the position of the hitch to align the agricultural implement, or individual row units, with the planting lines. In other embodiments, if the seed trench is not being closed, the control system 102 may adjust the configuration of the opening assembly, the gauge wheels, and/or the closing assembly on the row units. In other embodiments, a notification may be displayed on the display 162 of the operator interface 114. In response, the user may instruct the control system 102 to take a suggested corrective action, or the user may manually control the vehicle steering system 110 and/or the agricultural implement control system 112 to align the components of the row units of the agricultural implement with the planting lines. The control system 100 may be disposed on the work vehicle, the agricultural implement (e.g., on one or more row units), or both.

Figure 4:
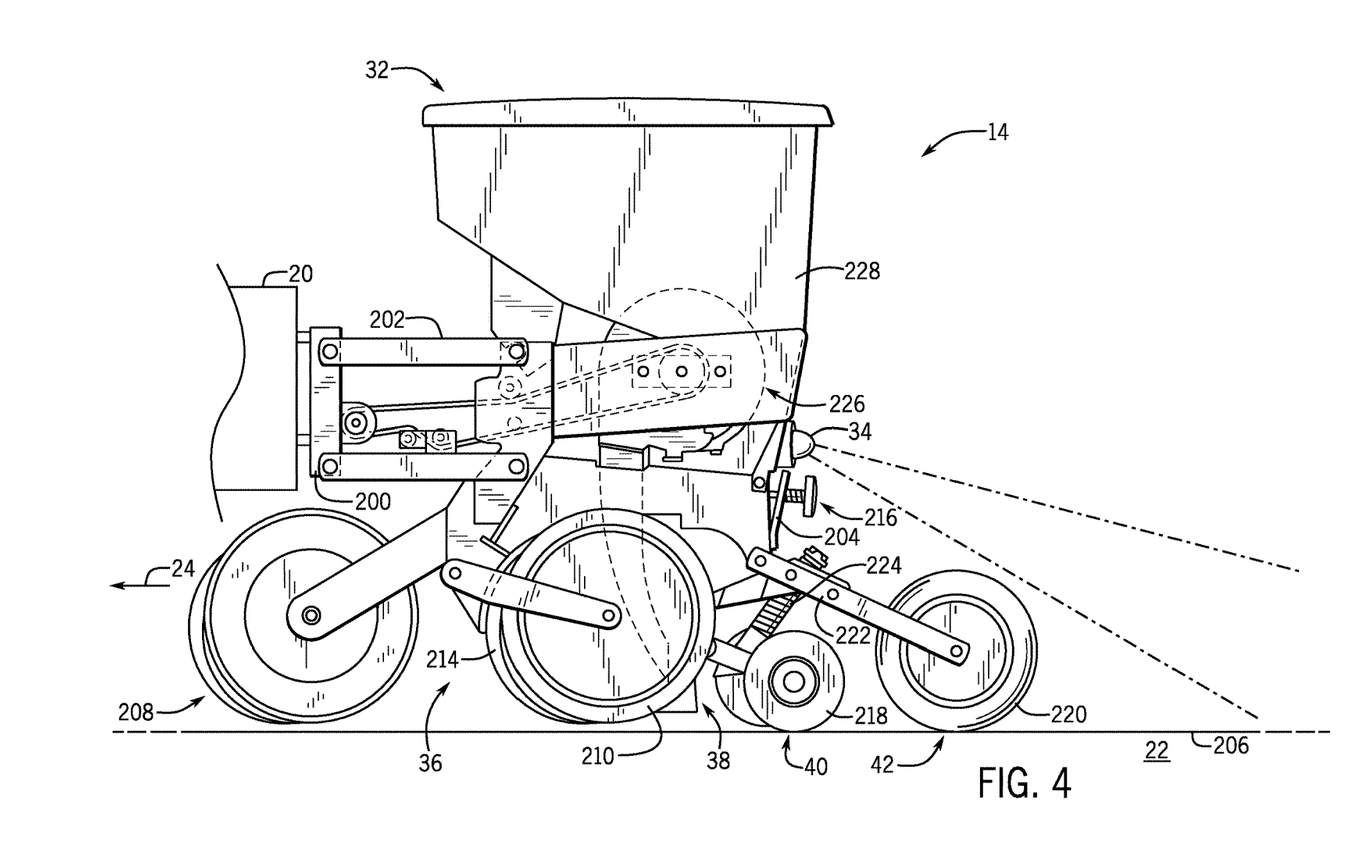
FIG. 4 is a side view of an embodiment of a row unit that may be used within the agricultural system of FIGS. 1-3.

FIG. 4 is a side view of a row unit 32 that may be used within the agricultural implement 14 shown in FIGS. 1-3. The row unit 32 includes a mount 200 that couples the row unit to the tool bar 20 of the implement 14. A linkage assembly 202 extends from the mount 200 to a frame 204 of the row unit 32. The linkage assembly 202 is configured to enable vertical movement of the frame 204 relative to the tool bar 20 in response to variations in a soil surface 206. In certain embodiments, a down pressure system (e.g., including a hydraulic actuator, a pneumatic actuator, etc.) may be coupled to the linkage assembly 202 and configured to urge the frame 204 toward the soil surface 206. As the work vehicle tows the implement 14 across the field 22, the row unit 32 is configured to deposit seeds and/or other agricultural products at a desired depth beneath the soil surface 206 as the row unit 32 traverses a field 22 along a direction of travel 24. The row unit 32 includes a residue management assembly 208 that may include tillage points or fingers configured to break up crop residue on the soil surface 206. The row unit 32 also includes the opening assembly 36 that forms a trench in the soil for seed deposition into the soil. In the illustrated embodiment, the opening assembly 36 includes gauge wheels 210, arms 212 that pivotally couple the gauge wheels 210 to the frame 204, and opener discs 214. The opener discs 214 are configured to excavate a trench into the soil, and the gauge wheels 210 are configured to control a penetration depth of the opener discs 214 into the soil. In the illustrated embodiment, the row unit 32 includes a depth control system 216 configured to control the vertical position of the gauge wheels 210 (e.g., by blocking rotation of the arms 212 in the upward direction beyond a selected orientation), thereby controlling the penetration depth of the opener discs 214 into the soil.

The row unit 32 also includes an agricultural product conveying system (e.g., seed planting assembly 38) configured to deposit seeds and/or other agricultural products (e.g., fertilizer) into the trench. The opening assembly 36 and the seed planting assembly 38 are followed by a closing assembly 40 that moves displaced soil back into the trench. In the illustrated embodiment, the closing assembly 40 consists of a two-stage closing disc system 218 and the closing assembly 40 is followed by a packing assembly 42 configured to pack soil on top of the deposited seeds and/or other agricultural products. The packing assembly 42 consists of a press wheel 220, an arm 222 that pivotally couples the press wheel 220 to the frame 204, and a biasing member 224 configured to urge the press wheel 220 toward the soil surface 206, thereby enabling the press wheel 220 to pack soil on top of the deposited seeds and/or other agricultural products to ensure proper seed-to-soil contact. However, it should be appreciated that in alternative embodiments, the closing assembly 40 may consist of other closing devices (e.g., V-press wheel, a single closing disc, etc.), additional biasing members to adjust horizontal and vertical spacing, or lateral position with respect to the direction of travel, or disk/wheel ground-contact angles, and in certain embodiments both the closing assembly and/or packing assembly may be coupled into a single assembly or omitted. In some embodiments, the opening assembly 36, the planting assembly 38, the closing assembly 40 and/or the packing assembly 42 may be automatically configured or reconfigured. While the illustrated biasing member 224 includes a spring, it should be appreciated that in alternative embodiments, the biasing member may include another suitable biasing device, such as a hydraulic cylinder or a pneumatic cylinder or an electric linear actuator, among others.

The row unit 12 includes a seed meter assembly 226 configured to receive agricultural product (e.g., seeds) from a hopper 228. In certain embodiments, the seed meter assembly 226 includes a disc having multiple openings. An air pressure differential between opposite sides of the disc induces the agricultural product (e.g., seeds) to be captured within the openings. As the disc rotates, the agricultural product is conveyed toward the agricultural product conveying system. When the agricultural product (e.g., seed) is aligned with an inlet to the agricultural product conveying system, the air pressure on each side of the disc is substantially equalized (e.g., at the end of a vacuum passage), thereby enabling the agricultural product (e.g., seed) to enter the agricultural product conveying system (e.g., seed tube or powered agricultural product conveyor). The agricultural product conveying system then directs the agricultural product to the trench. While the illustrated embodiment includes a vacuum seed meter, it should be appreciated that in alternative embodiments, other suitable seed/agricultural product meters may be utilized. As used herein, "vacuum" refers to an air pressure that is less than the ambient atmospheric air pressure, and not necessarily 0 pa.

If the trench opening assembly 36, the seed deposition assembly 38, and the trench closing assembly 40 of the row unit are not aligned with one another (e.g., the trench opening assembly 36 is to one side of the planting line 26 and the trench closing assembly 40 and/or the packing assembly 42 is to the other side of the planting line), the trench closing assembly 40 and/or the packing assembly 42 may not fully close the seed trench. The imaging device 34, which may be disposed on the implement 14 (e.g., on the planter tool bar 20 or the row unit 32) facing rearward, may capture imaging data of the soil surface 206 to facilitate determination of whether the seed trench is being closed effectively.

As is discussed in more detail below, the imaging system of the planter 14 may utilize computer vision algorithms, such as feature detection, blob detection, ridge/valley detection, edge/corner detection, textural analysis, wavelet analysis, disparity maps (e.g., stereo imagery), or a combination thereof, to determine whether the seed trenches have been effectively closed. For example, an insufficiently closed seed trench due to a misaligned row unit 32 may result in a seam along an edge of the seed trench where the seed trench has not been completely closed. The seam may appear in the images captured by the imaging devices 34 as a rough valley extending through each image, detectable by the imaging system. In other embodiments, the packer assembly 40 may leave a distinctive tread pattern on the soil surface 206. The imaging system may be configured to process images captured by the imaging devices 34 to recognize the tread of the packer wheel 220, and determine whether the tread is not present, not complete, and/or not aligned with the planting line 26. In some embodiments, the imaging system may be configured to determine an offset distance or an angle of incidence between the opening line (e.g., a line along which the opener discs 214 engage the soil surface) and the closing line (e.g., a ling along which the closing discs 218 and/or the packer wheel 220 engage the soil surface), as well as one or more quantitative scores or qualitative classifications consisting of one or more parameters indicative of the quality of seed trench closure (e.g. roughness, consistency, trench depth, residue/aggregate presence, etc.). The imaging system may also determine a suggested corrective action (e.g., steering the work vehicle, steering the implement 14, adjusting the hitch 18, etc.). In some embodiments, the control system may automatically implement the corrective action either a pre-programmed, or used-defined, or self-determined (e.g. machine learning) control regime or rule-set. In other embodiments, the control system may notify the operator (e.g., via the operator interface) of the seed trench closing failure. The control system may suggest corrective action for the operator to implement, or request authorization by the user to implement corrective action.

Figure 5:
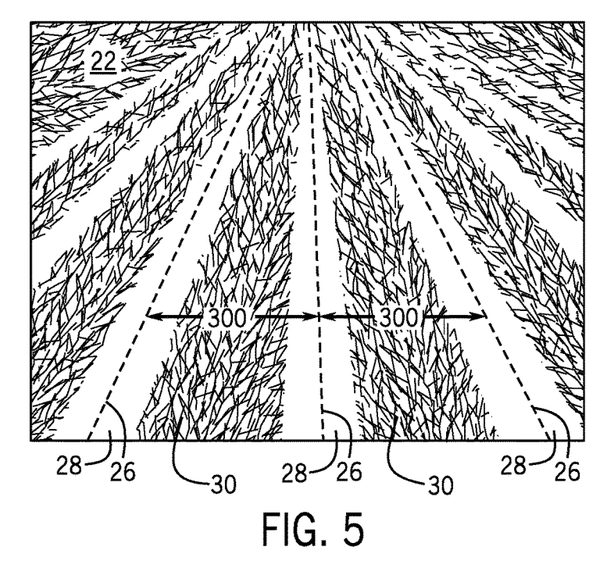
FIG. 5 is an embodiment of an image captured by one or more imaging devices of an imaging system of the control system of FIG. 3.

FIG. 5 is an embodiment of an image captured by one of the imaging devices. In the illustrated embodiment, the image does not include a part of the planter, but the position of each row unit relative to the imaging device may be stored in the memory of the imaging system and/or the control system. In other embodiments, the imaging system may determine the position of each row unit based on features in the image. In the illustrated embodiment, the opening assembly, the seed deposition assembly, and the closing assembly are centered beneath the imaging device. As shown, the planting lines 26 extend through the center of each strip 28, separated from one another by a distance 300. In some embodiments, the location of the planting lines 26 may be determined based on the captured images, while in other embodiments, the location of the planting lines 26 may be determined based on a map.

Figure 6:
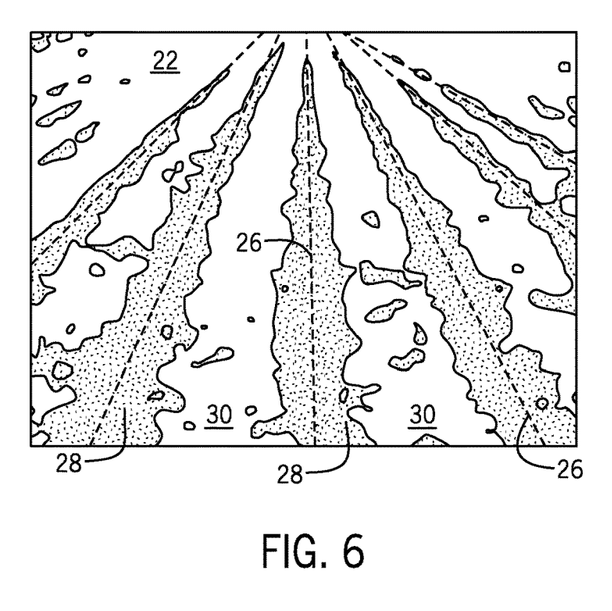
FIG. 6 is an embodiment of a processed image generated by the control system of FIG. 3.

FIG. 6 is an embodiment of a processed image generated by the control system. As part of the image processing, the control system may convert a captured image (see, e.g., FIG. 5) to a gray-scale image. From there, the control system may identify strips 28 and untilled rows 30. The control system may then determine the center of the strip 28 (e.g., the midpoint of a line across the width of the strip 28) at multiple locations along the length of the strip 28 within the image. The control system may then fit a straight line through the centers at the various locations to determine a center line (e.g., the planting line 26) of the strip 28. If the planting line 26 is offset from the center line of the strip 28, then the control system determines the center line and then uses an offset to determine the location of the planting line 26. Processing the images may utilize feature detection, textural analysis, frequency analysis (e.g., wavelet transform), disparity maps (e.g., using infrared or stereo imagery), etc.

Though FIGS. 5 and 6 depict a field 22 utilizing strip tilling, the same techniques may be used on fields 22 utilizing conventional tilling techniques. For example, as the row unit traverses the field 22, the row unit may close the seed trench and compress the soil used to close the seed trench, resulting in a row of flat soil. Using the techniques described above with regard to strip tilling, the imaging system may recognize the row of flat soil left by the packer wheel and determine row unit alignment. Similarly, the control system may also detect features indicative of seed trench closure or insufficient seed trench closure. In response to determining that the seed trench is not being effectively closed, the vehicle control system may take corrective action (e.g., steering the work vehicle, steering the agricultural implement, adjusting the hitch, etc.) in order to align the row units. In other embodiments, an indication may be displayed to the user, prompting the user to take corrective action or requesting authorization to take corrective action.

Figure 7:
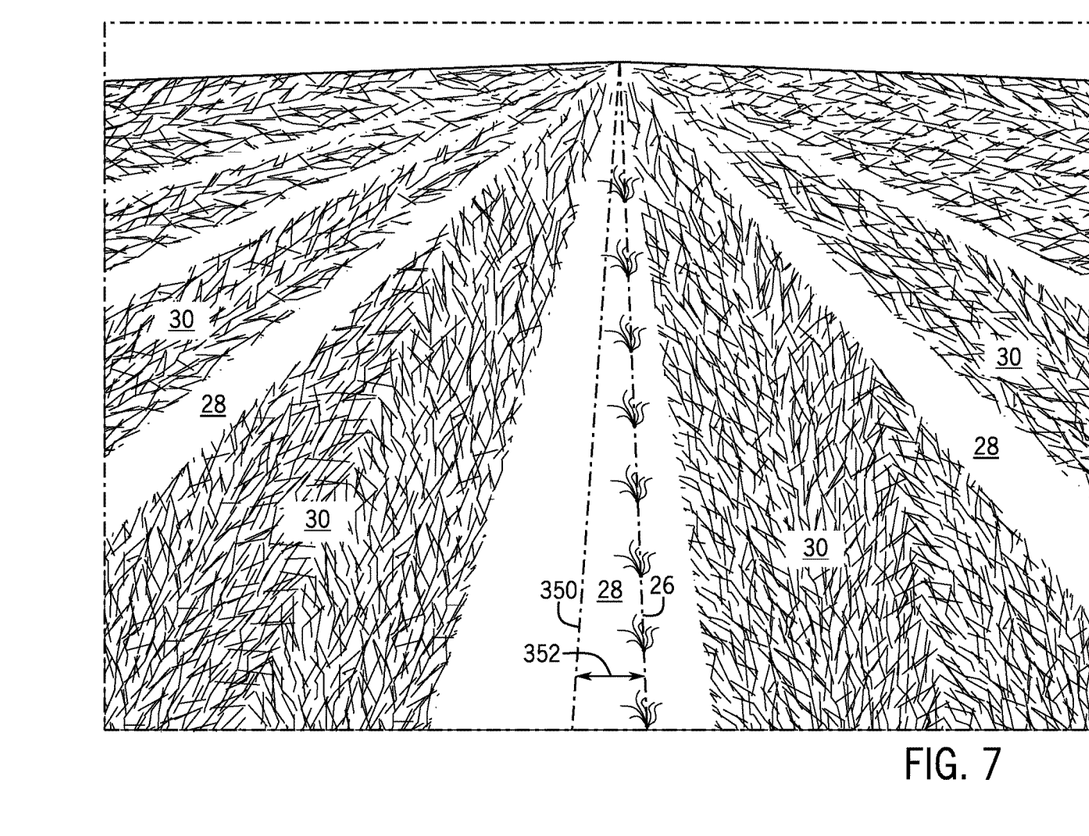
FIG. 7 is an embodiment of an image captured by the one or more imaging devices of an agricultural operation utilizing strip tilling and offset planting.

FIG. 7 is an embodiment of an image captured by one of the imaging devices of an agricultural operation utilizing strip tilling and offset planting. As with previous embodiments described above, strips 28 are separated by rows of untilled land 30. However, rather than the planting lines 26 (i.e., the lines along which seeds are planted) extending through the center of respective strips 28, each planting line 26 is off-set from a respective center line 350 of each strip 28 by a distance 352. In such an embodiment, during tilling, the row units 32 may be aligned with the centerline 350, and then for planting, the row units 32 may be aligned with the planting line 26 (i.e., offset from the center line 350 by a distance 352).

Figure 8:
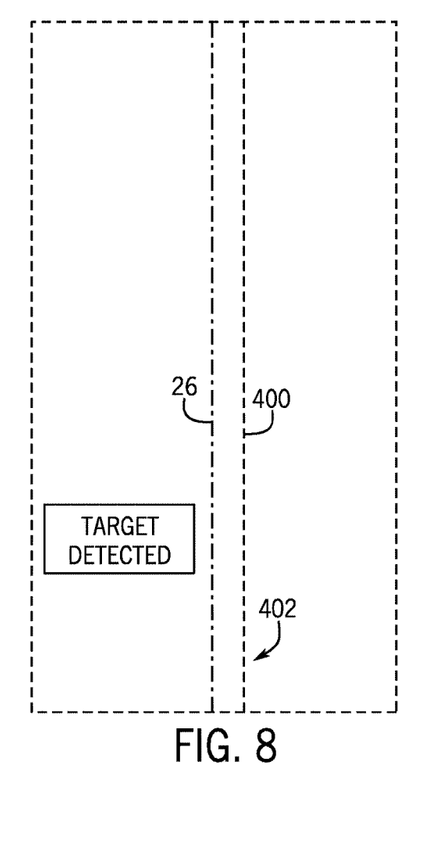
FIG. 8 is an embodiment of an image captured by the imaging devices of a seed trench left open due to misalignment of the row unit.

FIG. 8 is an embodiment of an image captured by the imaging system of a seed trench that has been left open due to misalignment of the opening line 398 and the closing line 400. As shown, the opening line 398 (i.e., the line over which the opening assembly passes) is offset from the closing line 400 (i.e., the line over which the closing assembly passes), resulting in a seam formed by an unclosed seed trench 402. Though the opening line 398 and the closing line 400 shown in FIG. 8 are substantially parallel to one another and offset from one another, in some embodiments, the opening line 398 may be incident to the closing line 400 at an angle. The location and orientation of the opening line 398 may be determined by the imaging system based on the captured images (as described with regard to FIG. 5), or based on a map of the field. For example, the opening line 398 may be determined based on the presence of an open trench or the seam from the unclosed seed trench 402. The location of the closing line 400 may be determined based on features in the captured images (e.g., a packing wheel tread, a ridge formed by closing discs, a difference in soil texture or roughness between each side of the seed trench), or based on a stored position of the one or more imaging devices relative to the row unit. For example, the imaging device may be disposed directly on top of the row unit, such that the closing line 400 passes through the center of the captured images. In other embodiments, a sufficiently close seed trench may be interpreted as an indication that the opening line 398 and the closing line 400 are aligned with one another.

Figure 9:
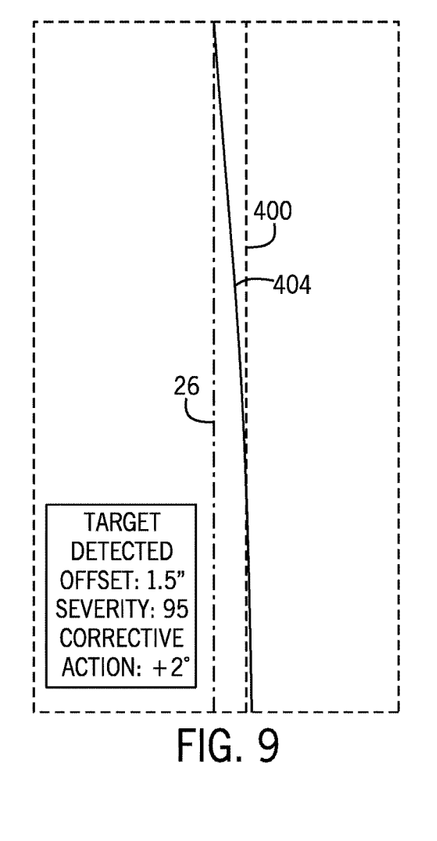
FIG. 9 is the image captured by the imaging devices of the seed trench shown in FIG. 8, with a severity score and a corrective line shown.

FIG. 9 is the image captured by the imaging system of the seed trench of FIG. 8, with a severity score and corrective line 404 shown. Once the locations of the opening line 398 and the closing line 400 have been determined, if the lines are misaligned, the control system may determine an offset between the lines 398, 400 and/or an angle of incidence. In some embodiments, the control system also determines a severity score indicative of the opening line 398 and the closing line 400, and thus seed trench closure. In other embodiments, a qualitative classification may be used to communicate trench closure or opening line 398 and closing line 400 alignment. The control system then develops the corrective line 404 to bring the opening line 398 into alignment with the closing line, or vice versa. In some embodiments, the control system may determine a corrective action (e.g., steering the work vehicle, steering the planter, adjusting the hitch, etc.) to direct the opening assembly, the closing assembly, or the packing assembly along the corrective line 404, bringing the opening line 398 and the closing line 400 into alignment. The agricultural system may automatically implement the corrective action, request authorization from the operator to implement the corrective action, or suggest that the user takes the corrective action.

Figure 10:
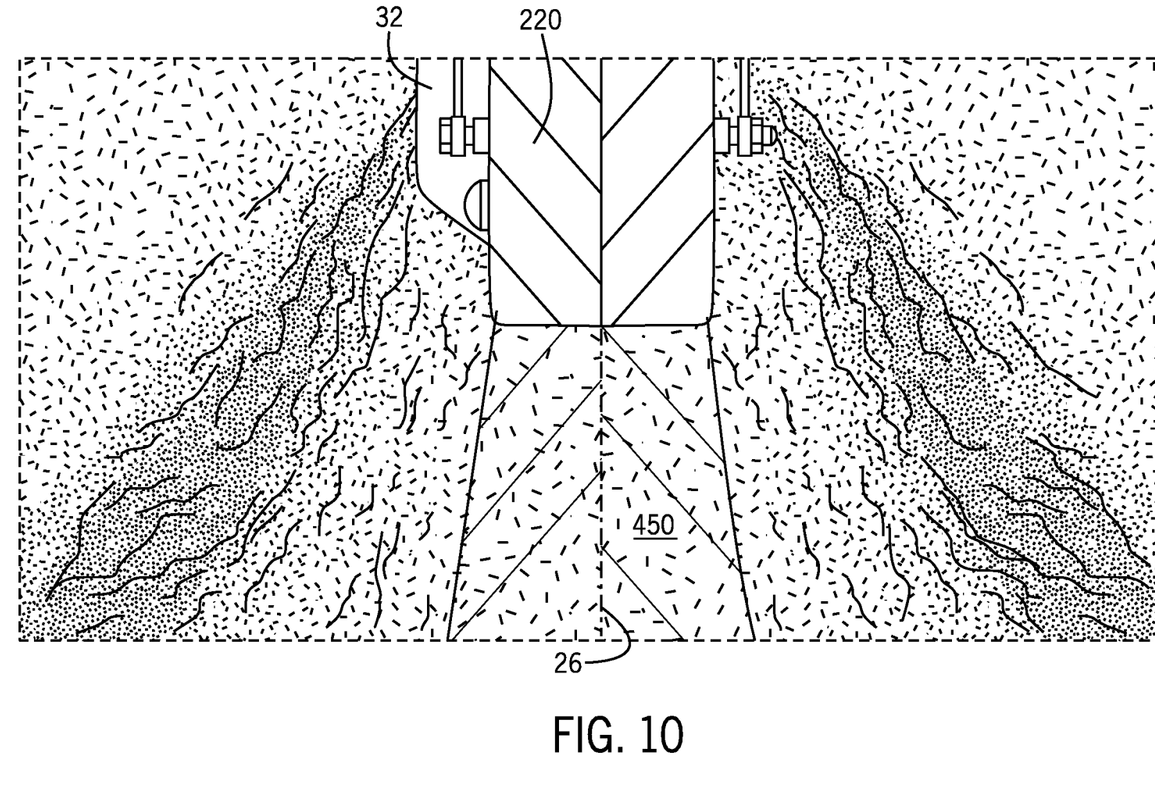
FIG. 10 is a rear view of the row unit completely closing the seed trench and leaving behind a packed strip.

FIG. 10 is a rear view of the row unit 32 completely closing the seed trench and leaving behind a packed strip 450. As shown, the packer wheel 220 has a tread pattern. After the closing assembly 40 closes the seed trench, the packer wheel 220 rolls along the planting line 26, over the top of the closed seed trench, packing down soil on top of the seeds to form the packed strip 450. As shown, if the soil is soft enough and made of small enough particles, the packer wheel 220 may leave a tread pattern on the packed strip 450. In some embodiments, the imaging system may recognize the tread pattern as an indication that the seed trench has been effectively closed, and thus, the opening line and the closing line are aligned with one another. In other embodiments, the control system may compare the tread pattern in the captured images to a stored tread pattern, and recognize a difference between the tread pattern in the captured images and the stored tread pattern as an indication of an open or partially open trench. In other embodiments, the imaging system may recognize the absence of an open seed trench as an indication that the seed trench has been closed. It should be understood however, that the tread pattern shown in FIG. 10 is merely one possible tread pattern of many possible tread patterns. Further, some embodiments may not include a packer wheel 220 or other element that packs down the closed trench. As such, in some embodiments, the imaging system may recognize the absence of an open trench (as opposed to the presence of a packed strip 450 or a packer wheel 220 tread pattern marking) as an indication that the seed trench has been effectively closed.

Figure 11:
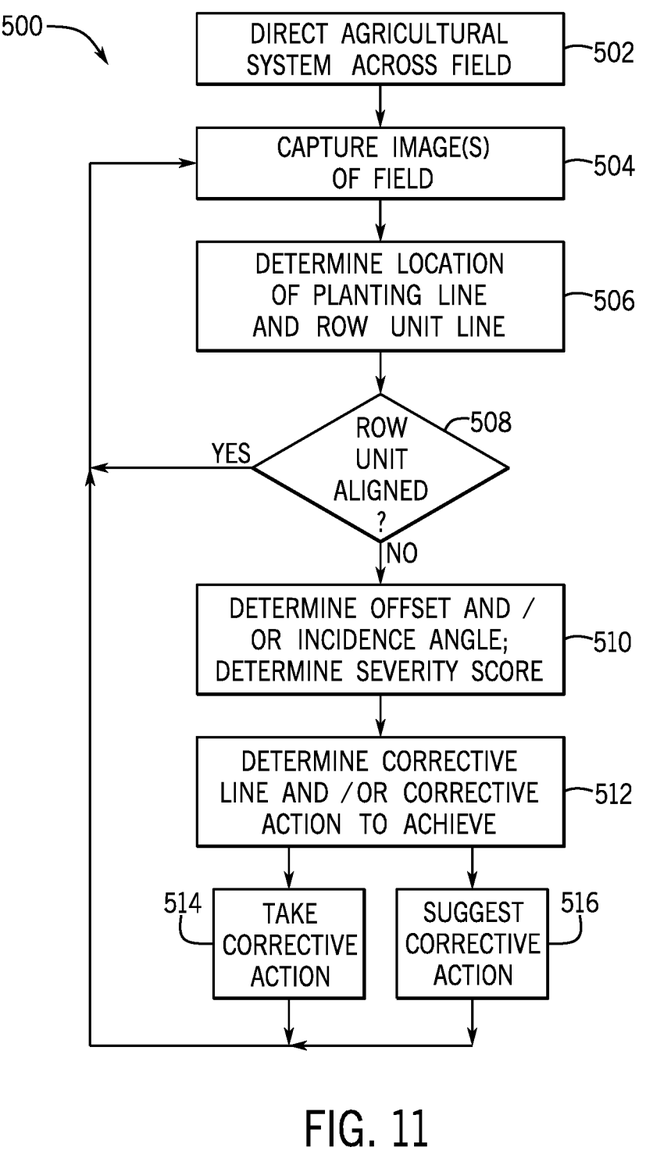
FIG. 11 is a flow chart of an embodiment of a process for aligning a row unit of the agricultural system of FIG. 1 to achieve complete seed trench closure.

FIG. 11 is a flow chart of an embodiment of a process 500 for aligning opening and closing assemblies of row units of the agricultural implement to achieve complete seed trench closure. In block 502, the planter is directed across the field (e.g., towed by the work vehicle). As the planter traverses the field, images are captured (block 504) of the field behind the planter. The images may be captured by one or more imaging devices, which may be disposed on the planter facing rearward. In block 506, the images are processed to determine locations of the opening lines and the closing lines. As discussed above, this process may include analyzing the presence of and/or positions of various features within the captured images relative to one another.

In decision 508, a determination is made as to whether the opening and closing assemblies of the row unit are aligned. Specifically, a determination is made as to whether the opening line is aligned with the closing line. For an implement having multiple row units traversing the field along multiple planting lines, the control system may determine whether a single row unit or a subset of the row units are aligned and extrapolate outward to all of the row units. In other embodiments, each row unit may have its own dedicated imaging device and a determination of alignment may be made for each row unit. If the opening line is aligned with the closing line, the process 500 returns to block 504 and captures images. If the opening line is not aligned with the closing line, or if the seed trench is not being sufficiently closed, the control system determines the offset distance and/or the incidence angle between the opening line and the closing line (block 510). At block 510, the severity score is also determined. The severity score is indicative of the misalignment between the opening line and the closing line, and/or the closure of the seed trench. In other embodiments, a qualitative classification may be determined instead of a quantitative score. In block 512, the control system determines the corrective line and/or corresponding corrective action (steering the work vehicle, steering the planter, adjusting the hitch, etc.) to bring the opening line and the closing line into alignment. At block 514, the corrective action may be automatically implemented. Alternatively, in block 516, the corrective action may be suggested to the operator. In response, the operator may authorize the control system to implement the corrective action, or the operator may manually implement the corrective action. The process then returns to block 504 and continues to capture images of the field.

For agricultural applications utilizing planter implements, being able to confirm seed trench closure may increase the efficiency and crop yield. The disclosed techniques include one or more imaging devices coupled to the planting implement and configured to capture images of the field as the planter traverses the field. The images may be processed to determine the locations of one or more opening lines (e.g., lines extending through the seed trench opening assembly) and one or more closing lines (e.g., lines extending through the seed trench closing assembly and/or the packing assembly), which may be indicative of seed trench closure. If the row units are not aligned, a control system may output instructions to bring the row unit or row units into alignment, to adjust the hitch of the work vehicle, to display an indication to the user, or a combination thereof.

While only certain features of the disclosed subject matter have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An agricultural planting or seeding implement, comprising:
   a frame;
   at least one row unit comprising:
   a seed trench opening assembly extending along an opening line and configured to open a seed trench;
   a seed deposition assembly configured to deposit a seed in the open seed trench; and
   a seed trench closing assembly extending along a closing line and configured to close the seed trench;
   one or more imaging devices, wherein the one or more imaging devices are configured to capture images of a field behind the agricultural planting implement as the agricultural planting implement traverses the field; and
   a processor configured to process the images captured by the one or more imaging devices, wherein processing the captured images comprises:
   determining a location of the opening line based on the captured images, a known location of the one or more imaging devices, or a combination thereof;
   determining a location of the closing line based on the captured images, the known location of the one or more imaging devices, or a combination thereof; and
   determining whether the opening line and the closing line are aligned with one another.

2. The agricultural planting or seeding implement of claim 1, wherein determining whether the opening line and the closing line are aligned with one another comprises identifying the presence of an open seed trench, identifying a packed strip, identifying a set of tire tread markings, identifying a ridge created by the seed trench closing assembly, or a combination thereof in the captured images.

3. The agricultural planting or seeding implement of claim 1, wherein the processor is configured to determine an offset distance between the opening line and the closing line, an angle of incidence between the opening line and the closing line, or a combination thereof, in response to determining that the opening line and the closing line are not aligned with one another.

4. The agricultural planting or seeding implement of claim 1, wherein the processor is configured to determine a quantitative score or a qualitative classification indicative of a quality of seed trench closure in response to determining that the opening line and the closing line are not aligned with one another.

5. The agricultural planting or seeding implement of claim 1, wherein processing the captured images comprises determining a corrective action to bring the opening line and the closing line into alignment in response to determining that the opening line and the closing line are not aligned with one another.

6. The agricultural planting or seeding implement of claim 5, wherein determining the corrective action to bring the opening line and the closing line into alignment comprises determining a corrective line to bring the opening line and the closing line into alignment.

7. The agricultural planting or seeding implement of claim 5, wherein determining the corrective action to bring the opening line and the closing line into alignment comprises generating a control signal to steer the agricultural planting implement, to steer a work vehicle towing the agricultural planting or seeding implement, to adjust a position of a hitch, or a combination thereof to bring the opening line and the closing line into alignment.

8. The agricultural planting or seeding implement of claim 5, wherein the processor is configured to generate a notification to be displayed to a user in response to determining that the opening line and the closing line are not aligned with one another.

9. An imaging system, comprising:
one or more imaging devices configured to be coupled to a frame of an agricultural planting or seeding implement, and to capture images of a field behind the agricultural planting or seeding implement as the agricultural planting or seeding implement traverses the field; and
a processor configured to process the images captured by the one or more imaging devices, wherein processing the captured images comprises:
determining a location of an opening line based on the captured images, a known location of the one or more imaging devices, or a combination thereof, wherein the opening line is aligned with a seed trench opening assembly configured to open a seed trench;
determining a location of a closing line based on the captured images, the known location of the one or more imaging devices, or a combination thereof, wherein the closing line is aligned with a seed trench closing assembly configured to close the seed trench;
determining whether the opening line and the closing line are aligned with one another; and
determining a corrective action to bring the opening line and the closing line into alignment in response to determining that the opening line and the closing line are not aligned with one another.

10. The imaging system of claim 9, wherein the one or more imaging devices comprise a digital still camera, a digital video camera, an analog camera, a red, green, blue (RGB) camera, a red, green, blue with depth sensor (RGB-D) camera, an infrared (IR) camera, a light detection and ranging (LIDAR) device, a radio detection and ranging (RADAR) device, or a combination thereof.

11. The imaging system of claim 9, wherein the one or more imaging devices comprise a laser scanner, a radar sensor, or a combination thereof.

12. The imaging system of claim 9, wherein the processor is configured to determine an offset distance between the opening line and the closing line, an angle of incidence between the opening line and the closing line, or a combination thereof, in response to determining that the opening line and the closing line are not aligned with one another.

13. The imaging system of claim 9, wherein the processor is configured to determine a quantitative score or a qualitative classification indicative of a quality of seed trench closure in response to determining that the opening line and the closing line are not aligned with one another.

14. The imaging system of claim 9, wherein determining the corrective action to bring the opening line and the closing line into alignment comprises determining a corrective line to bring the opening line and the closing line into alignment.

15. The imaging system of claim 9, wherein the processor is configured to generate a notification to be displayed to a user in response to determining that the opening line and the closing line are not aligned with one another.

16. A method, comprising:
directing an agricultural planting or seeding implement across a field, wherein the agricultural planting or seeding implement comprises at least one row unit comprising:
a seed trench opening assembly extending along an opening line and configured to open a seed trench;
a seed deposition assembly configured to deposit a seed in the open seed trench; and
a seed trench closing assembly extending along a closing line and configured to close the seed trench;
capturing one or more images of the field behind the agricultural planting or seeding implement as the agricultural planting or seeding implement traverses the field, via one or more imaging devices coupled to the agricultural planting or seeding implement;
determining a location of the opening line based on the captured images, a known location of the one or more imaging devices, or a combination thereof;
determining a location of the closing line based on the captured images, the known location of the one or more imaging devices, or a combination thereof;
determining whether the opening line and the closing line are aligned with one another; and
determining a corrective action to bring the opening line and the closing line into alignment in response to determining that the opening line and the closing line are not aligned with one another.

17. The method of claim 16, comprising:
determining an offset distance between the opening line and the closing line, an angle of incidence between the opening line and the closing line, or a combination thereof in response to determining that the opening line and the closing line are not aligned with one another;

determining a quantitative score or a qualitative classification indicative of a quality of seed trench closure in response to determining that the opening line and the closing line are not aligned with one another; and determining a corrective line to bring the opening line and the closing line into alignment in response to determining that the opening line and the closing line are not aligned with one another.

18. The method of claim 16, wherein determining the corrective action to bring the opening line and the closing line into alignment comprises generating a control signal to steer the agricultural planting or seeding implement, to steer a work vehicle towing the agricultural planting or seeding implement, to adjust a position of a hitch, adjusting a configuration of the seed trench opening assembly, adjusting a configuration of the seed trench closing assembly, or a combination thereof to bring the opening line and the closing line into alignment.

19. The method of claim 16, comprising generating a notification to be displayed to a user in response to determining that the opening line and the closing line are not aligned with one another.

20. The method of claim 17, wherein determining whether the opening line and the closing line are aligned with one another comprises identifying the presence of an open seed trench, identifying a packed strip, identifying a set of tire tread markings, identifying a ridge created by the seed trench closing assembly, or a combination thereof, in the captured images.

* * * * *